United States Patent
Egnor (10) Patent No.: US 7,801,897 B2
(45) Date of Patent: Sep. 21, 2010

(54) INDEXING DOCUMENTS ACCORDING TO GEOGRAPHICAL RELEVANCE

(75) Inventor: Daniel Egnor, New York, NY (US)

(73) Assignee: Google Inc., Mountain View, CA (US)

( * ) Notice: Subject to any disclaimer, the term of this patent is extended or adjusted under 35 U.S.C. 154(b) by 601 days.

(21) Appl. No.: 11/024,790

(22) Filed: Dec. 30, 2004

(65) Prior Publication Data

US 2006/0149774 A1      Jul. 6, 2006

(51) Int. Cl.
*G06F 7/00* (2006.01)

(52) U.S. Cl. .................. 707/741; 340/539.32

(58) Field of Classification Search ........................ None
See application file for complete search history.

(56) References Cited

U.S. PATENT DOCUMENTS

| | | | | |
|---|---|---|---|---|
| 5,968,109 | A * | 10/1999 | Israni et al. | 701/208 |
| 6,026,398 | A * | 2/2000 | Brown et al. | 707/5 |
| 6,202,065 | B1 * | 3/2001 | Wills | 707/5 |
| 6,308,177 | B1 * | 10/2001 | Israni et al. | 707/100 |
| 7,155,336 | B2 * | 12/2006 | Dorfman et al. | 701/200 |
| 7,197,500 | B1 * | 3/2007 | Israni et al. | 707/100 |
| 2001/0011270 | A1 * | 8/2001 | Himmelstein et al. | 707/3 |
| 2002/0057283 | A1 | 5/2002 | Biswas et al. | 345/700 |
| 2002/0156779 | A1 * | 10/2002 | Elliott et al. | 707/6 |
| 2002/0156917 | A1 * | 10/2002 | Nye | 709/238 |
| 2003/0204513 | A1 * | 10/2003 | Bumbulis | 707/100 |
| 2004/0139049 | A1 * | 7/2004 | Hancock et al. | 707/1 |
| 2004/0148277 | A1 * | 7/2004 | Gray | 707/3 |
| 2005/0097108 | A1 * | 5/2005 | Wang et al. | 707/100 |
| 2005/0262062 | A1 * | 11/2005 | Xia | 707/3 |
| 2006/0041375 | A1 * | 2/2006 | Witmer et al. | 701/208 |

FOREIGN PATENT DOCUMENTS

| | | | |
|---|---|---|---|
| JP | 2004-280659 | A | 9/2000 |
| JP | 2003-242151 | A | 10/2000 |
| JP | 2001-331501 | A | 11/2001 |
| JP | 2004-254024 | A | 8/2002 |
| JP | 2000-293099 | A | 8/2003 |
| JP | 2002-236732 | A | 9/2004 |
| JP | 2000-250842 | A | 10/2004 |
| WO | WO 00/23862 | A | 4/2000 |
| WO | WO02/23862 | * | 3/2002 |
| WO | WO0223862 | * | 3/2002 |
| WO | WO 02/065331 | A2 | 8/2002 |
| WO | WO02/065337 | * | 8/2002 |
| WO | WO 02/065337 | A2 | 8/2002 |
| WO | WO02065331 | * | 8/2002 |
| WO | WO 03/079229 | A1 | 9/2003 |

* cited by examiner

*Primary Examiner*—Don Wong
*Assistant Examiner*—Shyue Jiunn Hwa
(74) *Attorney, Agent, or Firm*—Harrity & Harrity, LLP (57) ABSTRACT

A local search engine efficiently indexes documents relevant to a geographical area by indexing, for each document, multiple location identifiers that collectively define an aggregate geographic region. When creating the index, the search engine may determine a set of geographical areas surrounding a geographical area relevant to a document and associate references to the set of geographical areas with the document index.

19 Claims, 12 Drawing Sheets

Gino's Pizza
100 Main Street
Washington, DC

INDEXING DOCUMENTS ACCORDING TO GEOGRAPHICAL RELEVANCE

BACKGROUND

A. Field of the Invention

Implementations described herein relate to search engines and, more particularly, to techniques through which local search engines can efficiently retrieve documents relevant to geographical regions.

B. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links.

In an attempt to increase the relevancy and quality of the web pages returned to the user, a search engine may attempt to sort the list of hits so that the most relevant and/or highest quality pages are at the top of the list of hits returned to the user. For example, the search engine may assign a rank or score to each hit, where the score is designed to correspond to the relevance or importance of the web page.

Local search engines are search engines that attempt to return relevant web pages and/or business listings within a specific geographic region. For a local search, a user may enter a search query and specify a geographic region around which the search query is to be performed. The local search engine may return relevant results, such as relevant web pages pertaining to the geographic region or listings of businesses in the geographic region, to the user.

With some local search engines, the local geographic region of interest is a region defined by a certain distance or radius from a starting location, such as a certain number of miles from a zip code or street address. Ideally, the local search engine should efficiently locate and return relevant results in the desired geographic region.

SUMMARY OF THE INVENTION

One aspect is directed to a method for indexing a document. The method includes determining a location associated with the document, determining a set of locations surrounding the location associated with the document, and indexing the document to include a reference to the location and the set of locations.

Another aspect of the invention is directed to yet another method for indexing a document. The method includes identifying a document having relevance to a first geographical area, determining a set of geographical areas surrounding the first geographical area, associating references to the first geographical area and the set of geographical areas with the document, and indexing the document with the associated references.

Yet another aspect of the invention is directed to a method of performing a search. The method includes receiving a search query associated with a geographic region, determining a location identifier associated with the geographic region, and performing a search for documents relevant to the search query based on a comparison of the search query and the location identifier to a document index.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

A local search engine may generate results for a local search query that are limited to desired geographic regions. The geographic region may be defined, for example, by a certain distance (e.g., 20 miles) from a specified point or region. The search results are efficiently generated by indexing geographically relevant documents based on the contents of the documents and also based on multiple location identifiers. In one implementation, the location identifiers define regularly spaced geographic areas and the documents are indexed such that the multiple location identifiers indexed for each document are selected to define a predetermined range around the region with which the document is associated. This document indexing technique allows for efficient searching by geographical region.

Exemplary Network Overview

Figure 1:
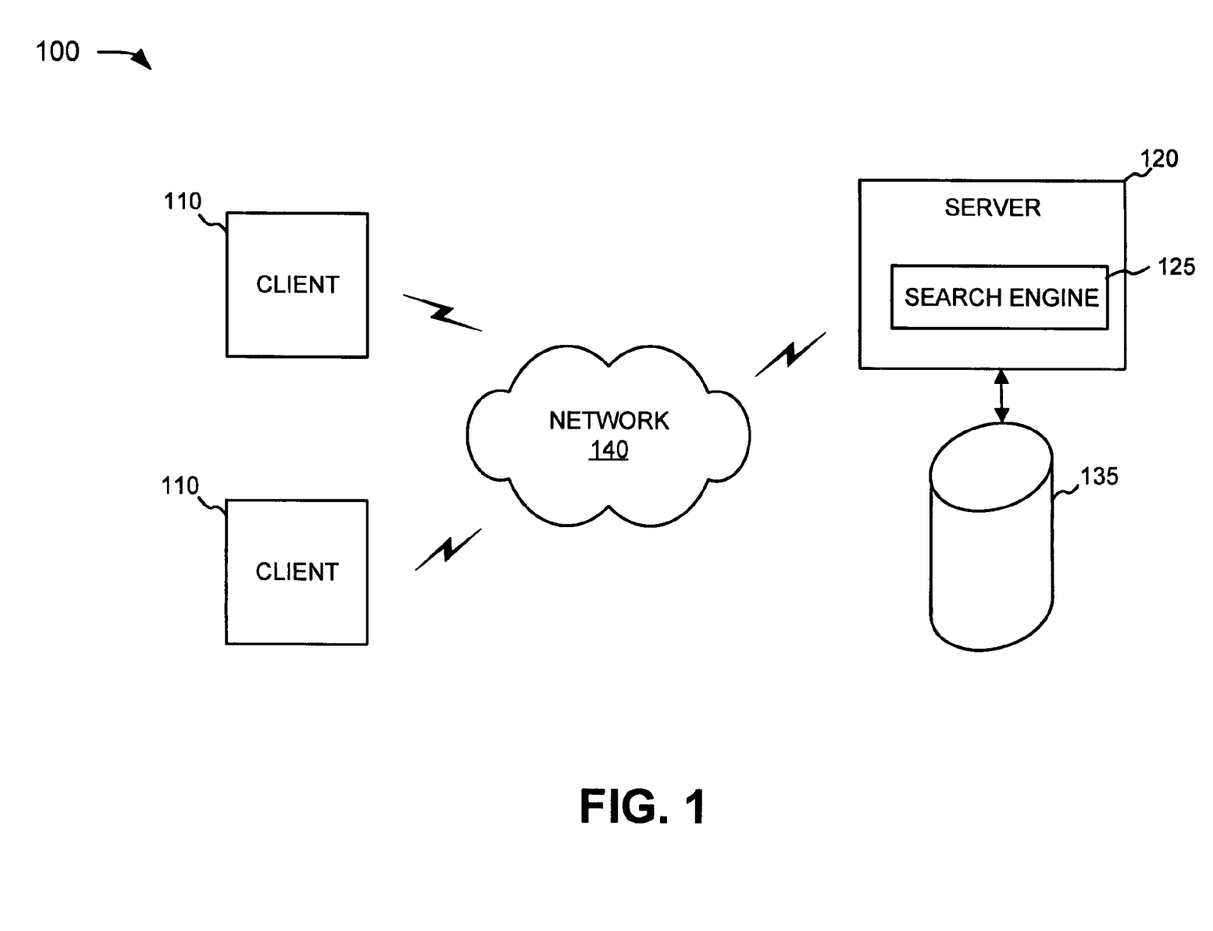
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include clients 110 connected to a server 120 via a network 140. Network 140 may include a local area network (LAN), a wide area network (WAN), a telephone network, such as the Public Switched Telephone Network (PSTN), an intranet, the Internet, or a combination of networks. Two clients 110 and one server 120 have been illustrated as connected to network 140 for simplicity. In practice, there may be more clients and/or servers. Also, in some instances, a client may perform the functions of a server and a server may perform the functions of a client.

A client 110 may include a device, such as a wireless telephone, a personal computer, a personal digital assistant (PDA), a lap top, or another type of computation or communication device, a thread or process running on one of these devices, and/or an object executable by one of these devices. Server 120 may include a server device that processes, searches, and/or maintains documents. Clients 110 and server 120 may connect to network 140 via wired, wireless, or optical connections.

Server 120 may include a search engine 125 usable by clients 110. Search engine 125 may be a query-based document search engine. Search engine 125 may particularly be designed to return results local to geographic regions. Search engine 125 may respond to user search queries based on documents stored in database 135. The documents stored in database 135 may generally include documents that were determined to be relevant to a particular geographic region. These documents may include, for instance, business listing information of businesses located at specific addresses or web documents that are in some way relevant to a geographic region (e.g., a web document providing a review of a local restaurant).

A document, as the term is used herein, is to be broadly interpreted to include any machine-readable and machine-storable work product. A document may be an e-mail, a business listing, a web site, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as Javascript, etc.).

Exemplary Client/Server Architecture

Figure 2:
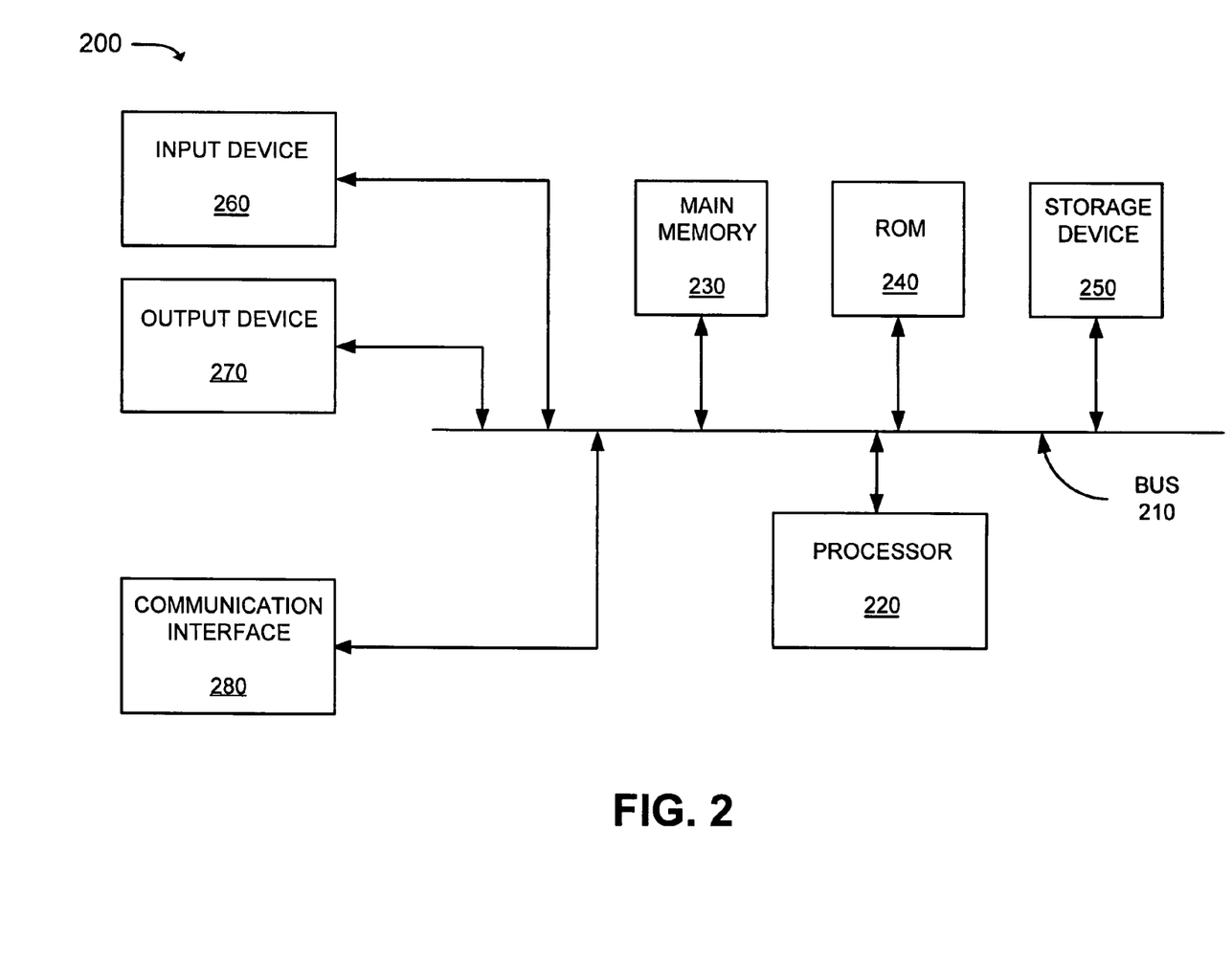
FIG. 2 is an exemplary diagram of a client or server shown in FIG. 1.

FIG. 2 is an exemplary diagram of a client 110 or server 120, referred to as computing device 200, according to an implementation consistent with the principles of the invention. Computing device 200 may include a bus 210, a processor 220, a main memory 230, a read only memory (ROM) 240, a storage device 250, an input device 260, an output device 270, and a communication interface 280. Bus 210 may include a path that permits communication among the components of computing device 200.

Processor 220 may include any type of conventional processor, microprocessor, or processing logic that may interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a conventional mechanism that permits a user to input information to computing device 200, such as a keyboard, a mouse, a pen, voice recognition and/or biometric mechanisms, etc. Output device 270 may include a conventional mechanism that outputs information to the user, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 140.

Search engine 125 may be stored in a computer-readable medium, such as memory 230. A computer-readable medium may be defined as one or more physical or logical memory devices and/or carrier waves. The software instructions defining search engine 125 may be read into memory 230 from another computer-readable medium, such as data storage device 250, or from another device via communication interface 280. The software instructions contained in memory 230 cause processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Location Identifiers

Documents in database 135 may each be associated with a geographical region. The geographical region may be specified by a location identifier associated with the document. In one implementation, location identifiers may be derived from a model of the Earth's surface using a hierarchical grid, such as the well known Hierarchical Triangular Mesh (HTM) model. For the readers convenience, the HTM model will now be briefly described.

Figure 3A:
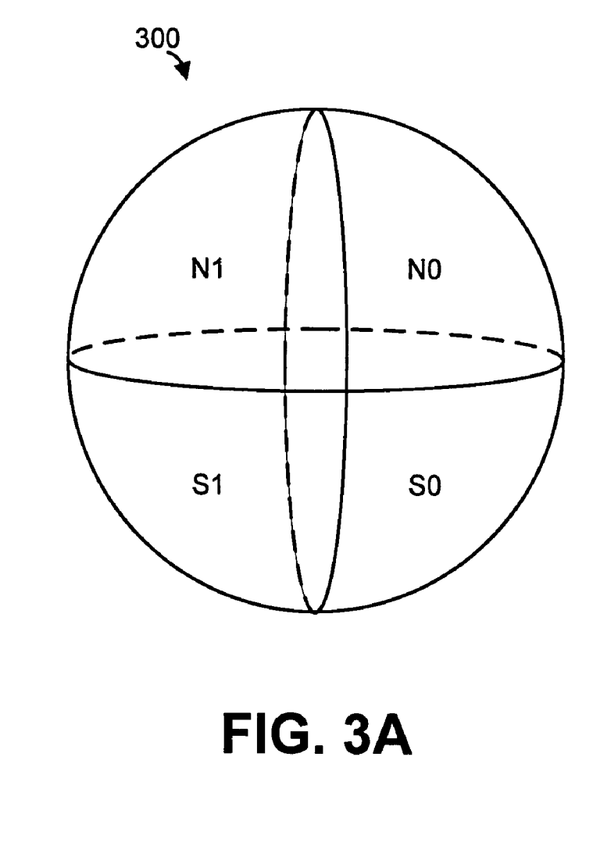
FIGS. 3A and 3B are diagrams illustrating a hierarchical triangular mesh (HTM)
Figure 3B:
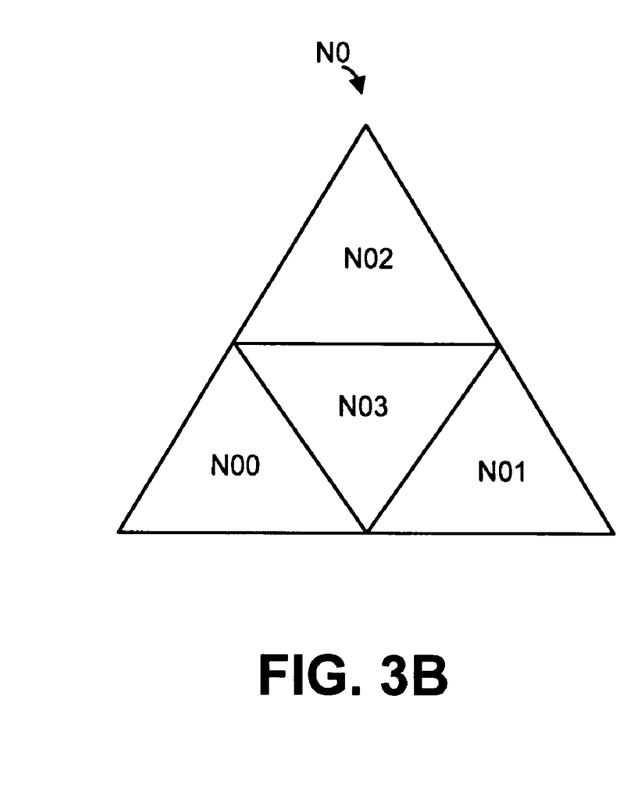

The Hierarchical Triangular Mesh (HTM) is a partitioning scheme to divide the surface of a sphere, such as the Earth, into spherical triangles. It is a hierarchical scheme and the subdivisions have not exactly, but roughly equal areas. FIG. 3A is a diagram illustrating an initial subdivision of a sphere 300 (e.g., the Earth's surface) into eight regions, identified as regions N0, N1, N2, N3 and S0, S1, S2, S3. In FIG. 3A, only regions N0, N1, S0, and S1 are labeled; the other regions correspond to the "back half" of the sphere. These subdivisions are the eight largest equal-sized spherical triangles. Each subdivision may be further subdivided into triangles by connecting the side-midpoints of neighboring sides. FIG. 3B is a diagram illustrating a next subdivision level. As shown in FIG. 3B, subdivision N0 is further divided into four subdivisions, labeled as subdivisions N00, N01, N02, and N03. Although each subdivision is actually formed by arcs on a sphere, for simplicity, the subdivisions in FIG. 3B are shown as line segments of a triangle. As the subdivision size decreases, each subdivision will be more closely triangular in shape.

The subdivisions can be thought of as child nodes in a tree structure having eight root nodes (N0, N1, N2, N3, S0, S1, S2, and S3) and in which each root node may have four child nodes. The subdivisions may be continued to any level. In the naming scheme shown, at each successive level, the subdivisions are named by adding an additional character to the subdivision label. As an example, consider the node N201102. N2 refers to the root name, and the five succeeding digits (01102) denote which triangle to choose at each level.

These subdivision labels may be used as location identifiers associated with geographically relevant documents in database 135.

One of ordinary skill in the art will recognize that geographic surface modeling techniques other than HTM, or differing implementations of HTM, could be used to implement the location identifiers stored in database 135. For example, other possible subdivision modeling techniques that could alternatively be used include HEALPix (Hierarchical Equal Area isoLatitude Pixelisation), C-Keys, UTM (Universal Transverse Mercator), and other various regional grid systems (such as the United Kingdom's National Grid).

Indexing of Database 135

Figure 4:
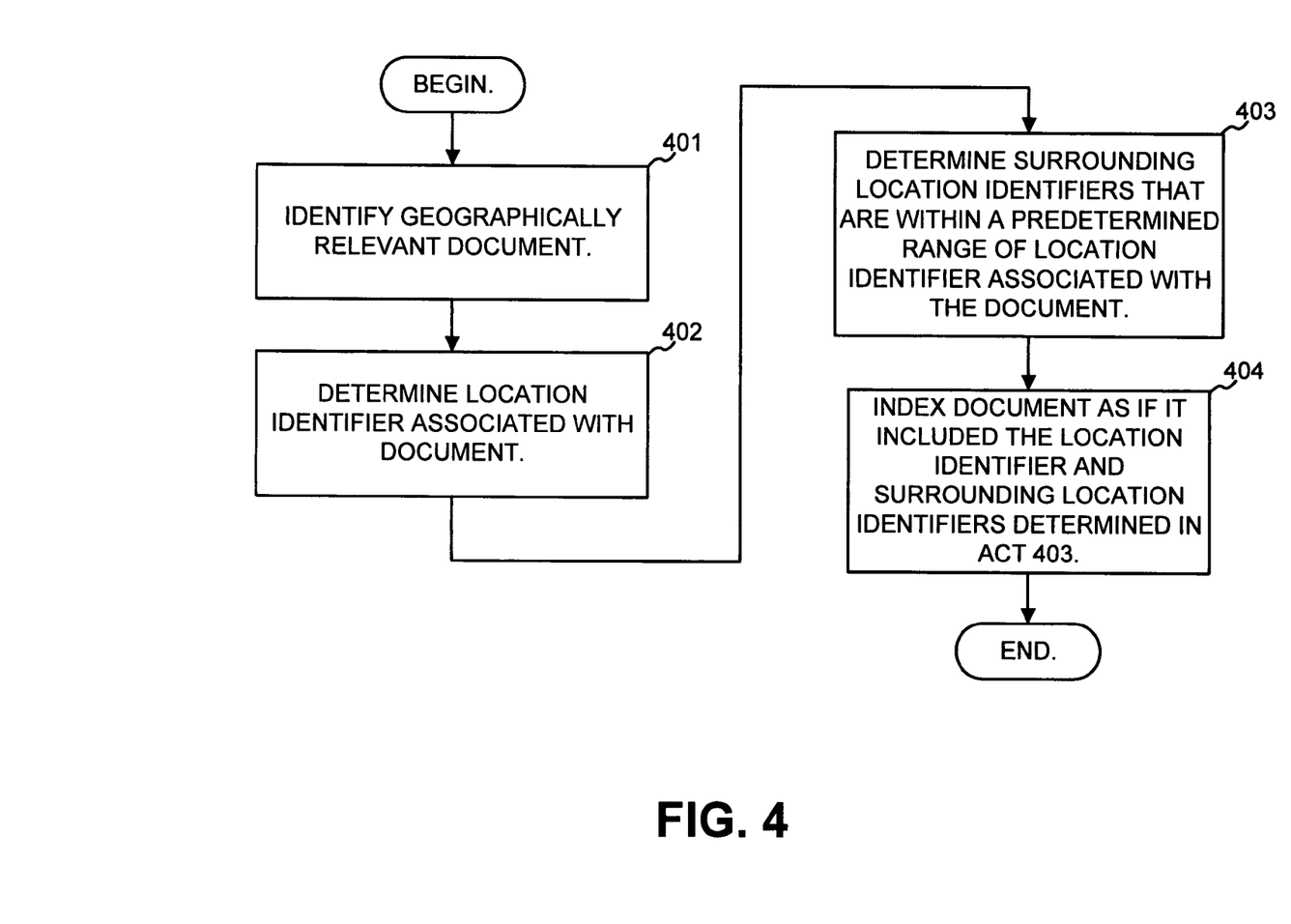
FIG. 4 is a flowchart illustrating exemplary operations consistent with aspects of the invention for indexing a document having geographical relevance.

FIG. 4 is a flowchart illustrating exemplary operations consistent with aspects of the invention for indexing a document having geographical relevance.

As mentioned, database 135 may include an index of documents, such as geographically relevant web documents and business listings. The index may be an index of terms found in the documents and may be formed as an inverted index data structure that stores, for each term, a list of all documents that contain the term.

A geographically relevant document may be identified (act 401). A geographically relevant document, as used herein, generally refers to any document that, in some manner, has been determined to have particular relevance to a geographical location. Business listings, such as yellow page listings, for example, may each be considered to be a geographically relevant document that is relevant to the geographic region defined by the address of the business. Other documents, such as web documents, may also have particular geographical relevance. For example, a business may have a home page, may be the subject of a document that comments on or reviews the business, or may be mentioned by a web page that in some other way relates to the business. The particular geographic location for which a document is associated may be determined in a number of ways, such as from the postal address or from other geographic signals.

The geographic region associated with the geographically relevant document may next be mapped to its corresponding location identifier (act 402). In other words, the HTM identifier (e.g., N201102) associated with the document is determined. This mapping may be performed by, for example, looking up a postal address or latitude/longitude location of the document in a predefined lookup table that corresponds postal address locations (or latitude/longitude specified locations) to the appropriate HTM identifier.

Figure 5:
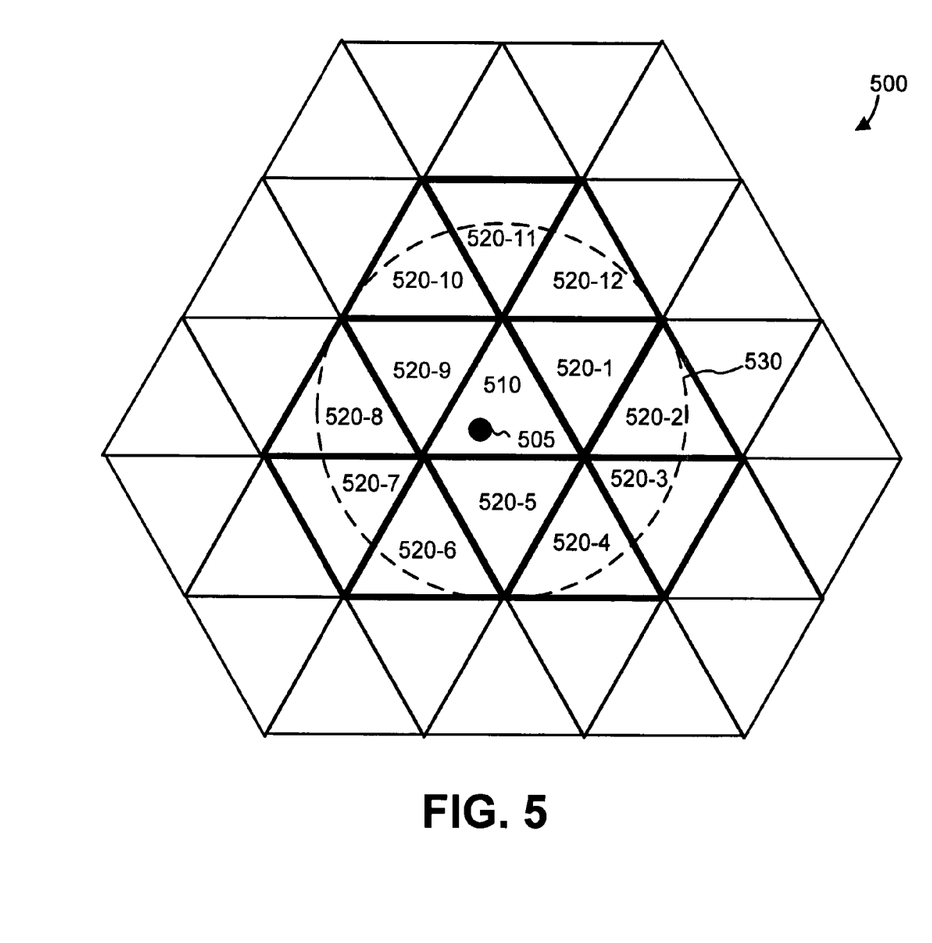
FIG. 5 is a diagram illustrating the operations shown in FIG. 4.

Additional location identifiers may be determined for the document. In particular, location identifiers corresponding to surrounding regions within a predetermined range may also be determined (act 403). FIG. 5 is a diagram illustrating an exemplary implementation of act 403. In this example, assume that the predetermined range is chosen to be one mile, which is illustrated by circle 530. Grid 500 represents a portion of the HTM mesh at a particular mesh level, such as a mesh level in which each triangular region represents approximately one square mile. Assume that the document is associated with a business 505 in triangular geographic region 510. As illustrated by circle 530, regions 520-1 through 520-12 at least partially fall within a one mile range of region 510. Accordingly, the geographic regions that are within approximately one mile of the center of region 510 include the geographic regions defined by regions 510 and 520 (illustrated in FIG. 5 in bold).

Returning to FIG. 4, search engine 125 may index each geographically relevant document as if the document included the location identifiers associated with the document's region as well as the surrounding regions identified in act 403 (act 404). In the example of FIG. 5, for instance, the document may be indexed such that the HTM identifiers for all of regions 510 and 520-1 through 520-12 are included in the index for this document. In one implementation, the location identifiers may be associated with special tags in database 135 that indicate they are not part of the original document text.

Figure 6A:
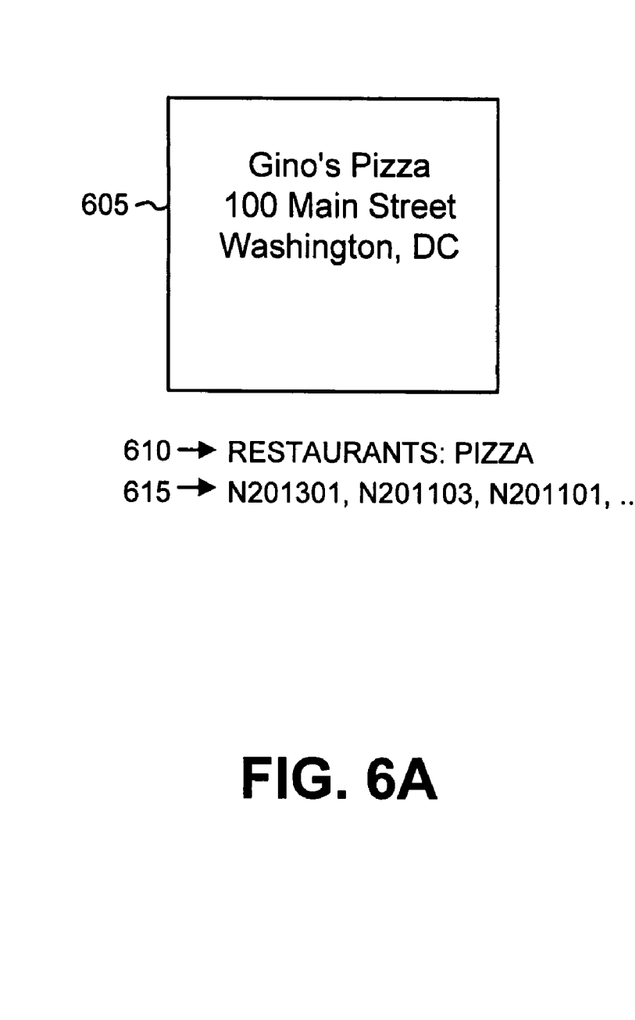
FIGS. 6A and 6B illustrate exemplary documents having geographical relevance.
Figure 6B:
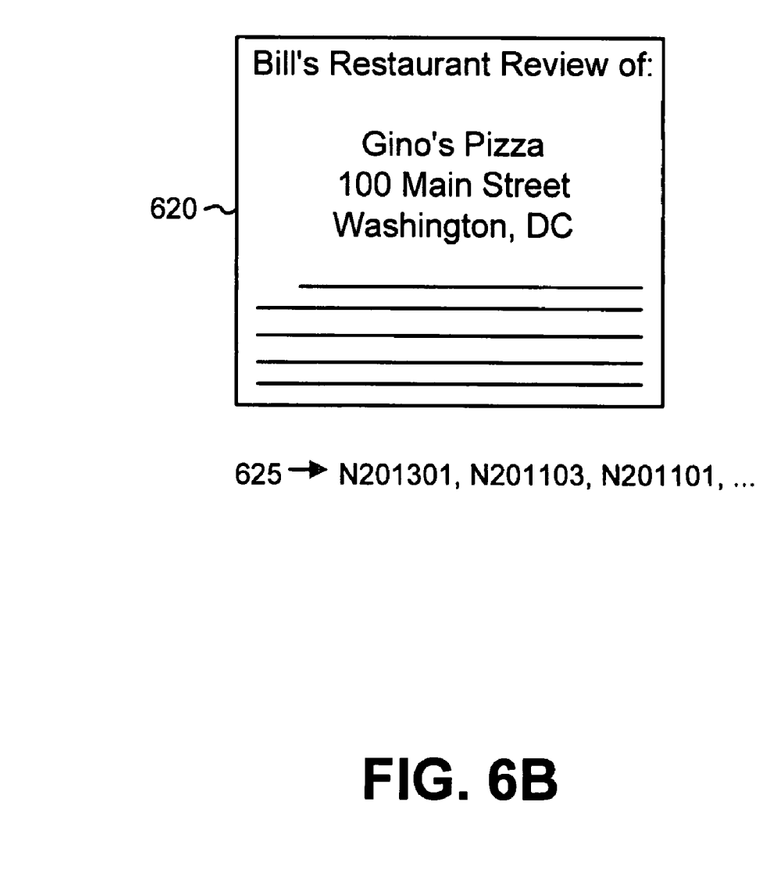

FIGS. 6A and 6B are diagrams illustrating exemplary documents that may be indexed in database 135 using the operations shown in FIG. 4. FIG. 6A illustrates a business listing 605 for a hypothetical restaurant "Gino's Pizza." Search engine 125 may index the text of document 605 as well as the location identifiers and potentially other information associated with the document. In this example, category information 610 and location identifiers 615 are also indexed with the document. The first location identifier, HTM region N201301, may refer to the specific geographic region with which Gino's Pizza is located (e.g., region 510 in the example of FIG. 5), while the remaining location identifiers may reference the geographic regions surrounding N201301 (e.g., regions 520 in the example of FIG. 5).

FIG. 6B illustrates a hypothetical web page 620 that includes a review of Gino's Pizza. Web page 620 may be determined to be geographically relevant, as it is primarily about a business at a specific geographic location. Accordingly, web page 620 may also be associated with the same geographical region as Gino's Pizza. Location identifiers 625 may thus be associated with and indexed with web page 620 in a manner similar to location identifiers 615, which are associated with and indexed with business listing 605 such that multiple location identifiers may be associated with document 520.

For ease of explanation, the exemplary HTM regions shown in FIGS. 5, 6A, and 6B reference fifth level child nodes. In practice, HTM regions that refer to areas appropriate for providing local search results will tend to be at lower node levels.

Figure 7:
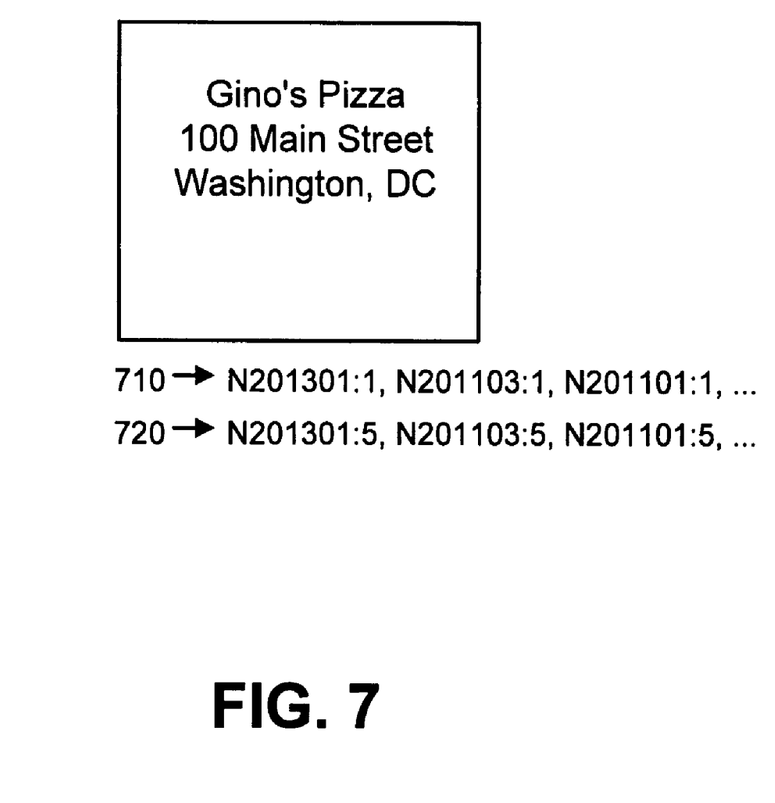
FIG. 7 is a diagram illustrating another exemplary document having geographical relevance.

FIG. 7 is a diagram illustrating indexing of another exemplary document using the operations shown in FIG. 4. The document of FIG. 7 is identical to the document of FIG. 6A, except that two sets of location identifiers, corresponding to two different predetermined ranges, were determined instead of just one set. In this example, location identifiers 710 may be the set of location identifiers determined when the predetermined range is one mile. The second set of location identifiers, labeled as location identifiers 720, may be selected based on another value for the predetermined range, such as five miles. Accordingly, there would be more location identifiers 720 than 710 and location identifiers 710 are a subset of location identifiers 720. Both sets of location identifiers may be independently indexed with the document.

In one implementation, the location identifiers in sets 710 and 720 may be distinguished from one another during indexing by appending a label to the two sets of location identifiers. In this example, the label ":1" is appended to location identifiers 710 to indicate that they correspond to the one mile identifiers and the label ":5" is appended to location identifiers 720 to indicate that they correspond to the five mile identifiers.

Operation of Search Engine

Figure 8:
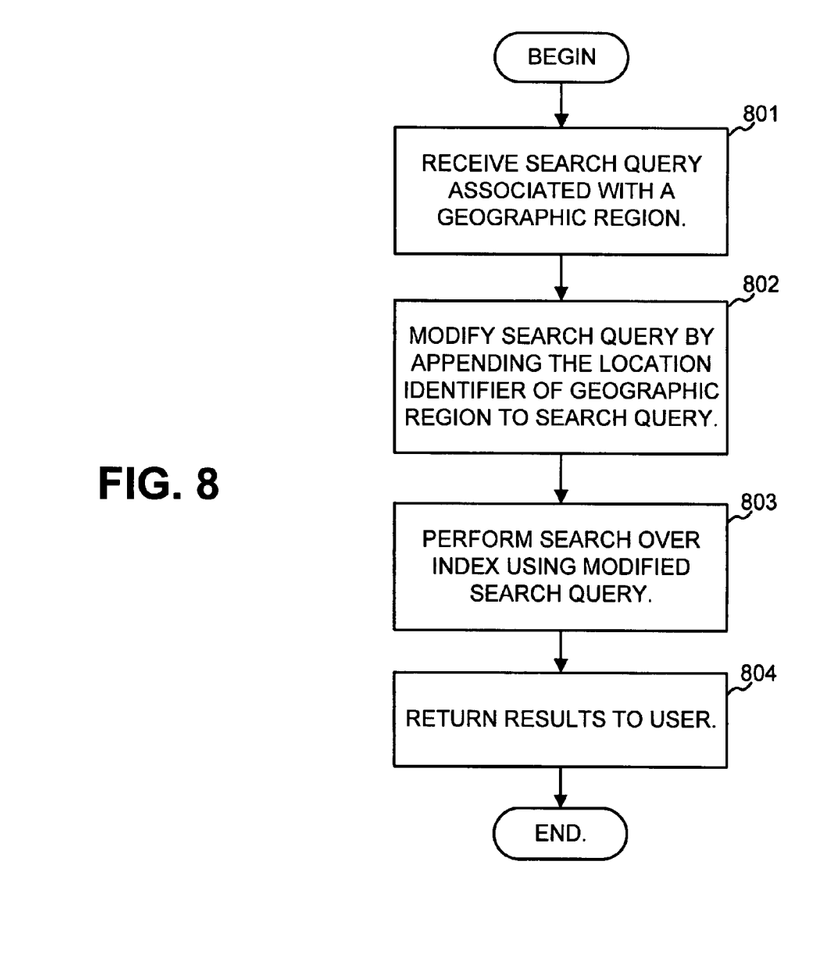
FIG. 8 is a flowchart illustrating exemplary operations of a search engine in processing local search queries according to an implementation consistent with aspects of the invention.

FIG. 8 is a flow chart illustrating exemplary operations of search engine 125 in processing local search queries. Search engine 125 may receive a search query from a user (act 801). The search query may be a local query and may be associated with a geographic area. For instance, the user may search for "coffee shops" and specify that the location is the "Poughkeepsie, N.Y." area. Search engine 125 may convert the region entered by the user to one or more location identifiers having the format of the location identifiers used when creating the document index stored in database 135 (e.g., HTM identifiers). The location identifier may next be appended to the search query (act 802). For instance, if the search query is "coffee shops" and the corresponding location identifier is determined to be N03013, the modified search query may be "coffee shops N03013." In implementations in which different sets of location identifiers were identified based on differing predetermined ranges, the modified search query may include the location identifier that corresponds to the range that is to be searched. For example, the modified search query "coffee shops N03013:5" may be used for a local search within a five mile radius.

The modified search query may then be used to obtain search results in a conventional manner (act 803). For example, search engine 125 may identify documents from the document index that contain the terms in the search query. Alternatively or additionally, search engine 125 might identify documents that contain synonyms of the search terms. Because the modified search query includes the location identifier corresponding to the center of the search region, and the geographically relevant documents are indexed to include the location identifiers of all regions within the predetermined range, the search result will be limited to documents within the predetermined search range. Thus, for the example search "coffee shops N03013:5," the search results would be documents relevant to coffee shops, such as coffee shop business listings, within five miles of Poughkeepsie, N.Y.

The search results obtained in act 803 may then be returned to the user (act 804). In one implementation, the results may be displayed as a ranked list of business listings that are relevant to the user query. Each listing may contain information, such as address information for the business associated with the business listing, a telephone number for the business, a link to more information associated with the business, a link to directions to the business, and/or a link to one or more web documents that refer to the business.

Figure 9:
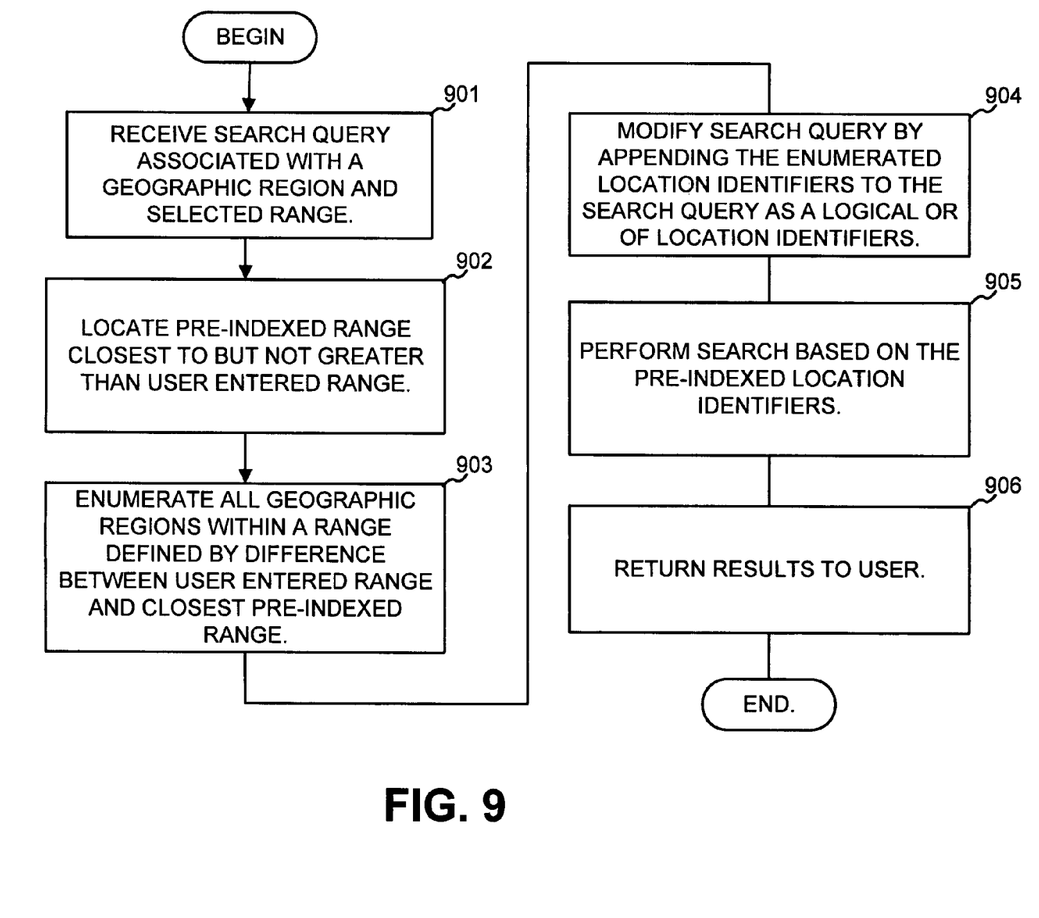
FIG. 9 is a flow chart illustrating exemplary operations of a search engine in processing local search queries according to another implementation consistent with aspects of the invention.

FIG. 9 is a flow chart illustrating exemplary operations of search engine 125 in processing local search queries when the selected search range does not match a predetermined indexing range. Search engine 125 may receive a search query from a user (act 901). The search query may be a local query and may be associated with a geographic area and include an indication of the range for which the user would like to search. For instance, the user may search for "coffee shops," specify that the location is the "Poughkeepsie, N.Y." area, and specify that the user would like a search radius of three miles.

Figure 10:
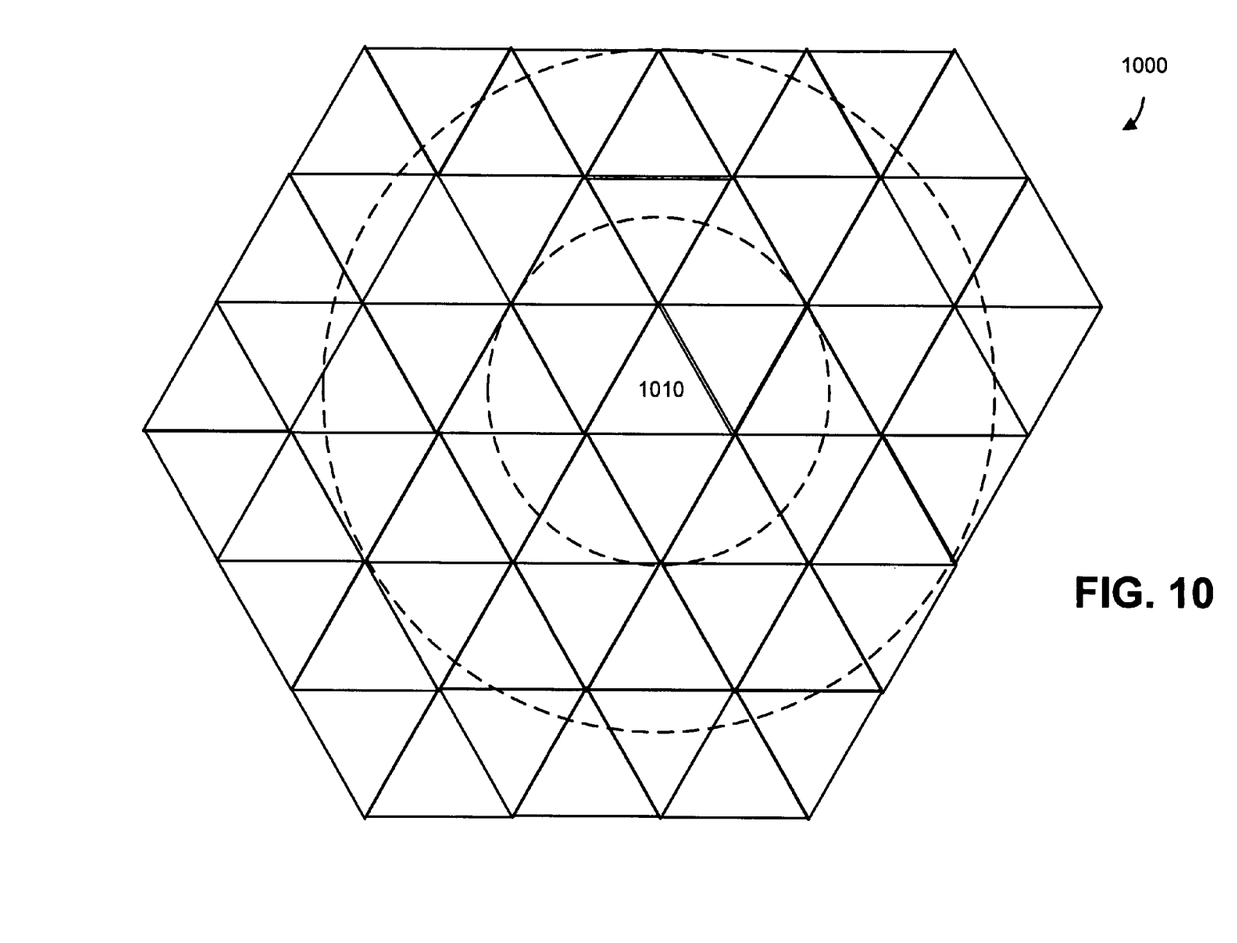
FIG. 10 is a diagram of an exemplary HTM grid used to illustrate the acts shown in FIG. 9.

Assume that the three-mile search range chosen by the user is not one that is specifically indexed in database 135. The pre-indexed range closest to but not greater than the range chosen by the user may be determined (act 902). Assume in this example that the closest pre-indexed range is one mile. That is, a location identifier set was added to the index for a range of one mile. Search engine 125 may next locate the set of regions that are within two miles (three miles–one mile) of the geographic area associated with the search (act 903). FIG. 10 is a diagram of an exemplary HTM grid 1000 illustrating acts 902 and 903. Assume that region 1010 is the region associated with the search, the inner dashed circle represents a one mile radius, and the outer dashed circle represents a two mile radius. Accordingly, for this example, in act 903, search engine 125 may locate the set of regions included in the outer circle.

The search query may then be modified by appending the location identifiers identified in act 903 to the search query as a logical OR operation (act 904). In the example above, in which the original search query was "coffee shops," the modified search query may be "coffee shops" plus a logically ORed list of all the location identifiers that correspond to the triangular regions that fall within the outer dashed circle in FIG. 10. The modified search query may then be used to obtain search results in a conventional manner in which the search query is applied to the pre-indexed location identifiers determined in act 902 (act 905). The above "coffee shop" search may thus be applied to the one mile pre-indexed location identifiers.

The search results obtained in act 905 may then be returned to the user (act 906). In one implementation, the results may be displayed as a ranked list of business listings that are relevant to the user query.

As an alternate possible variation of the techniques shown in FIG. 9, instead of pre-indexing documents with a number of location identifiers, each document may be indexed with only the location identifier associated with the document. Search queries may then be formulated as performed in act 903, where the range is the whole search region. That is, the query may include a logical OR concatenation of all the location identifiers within the search range. This variation reduces index size and may allow for more flexibility in selecting the region size and shape at query time but increases query complexity.

Example User Interface

Figure 11:
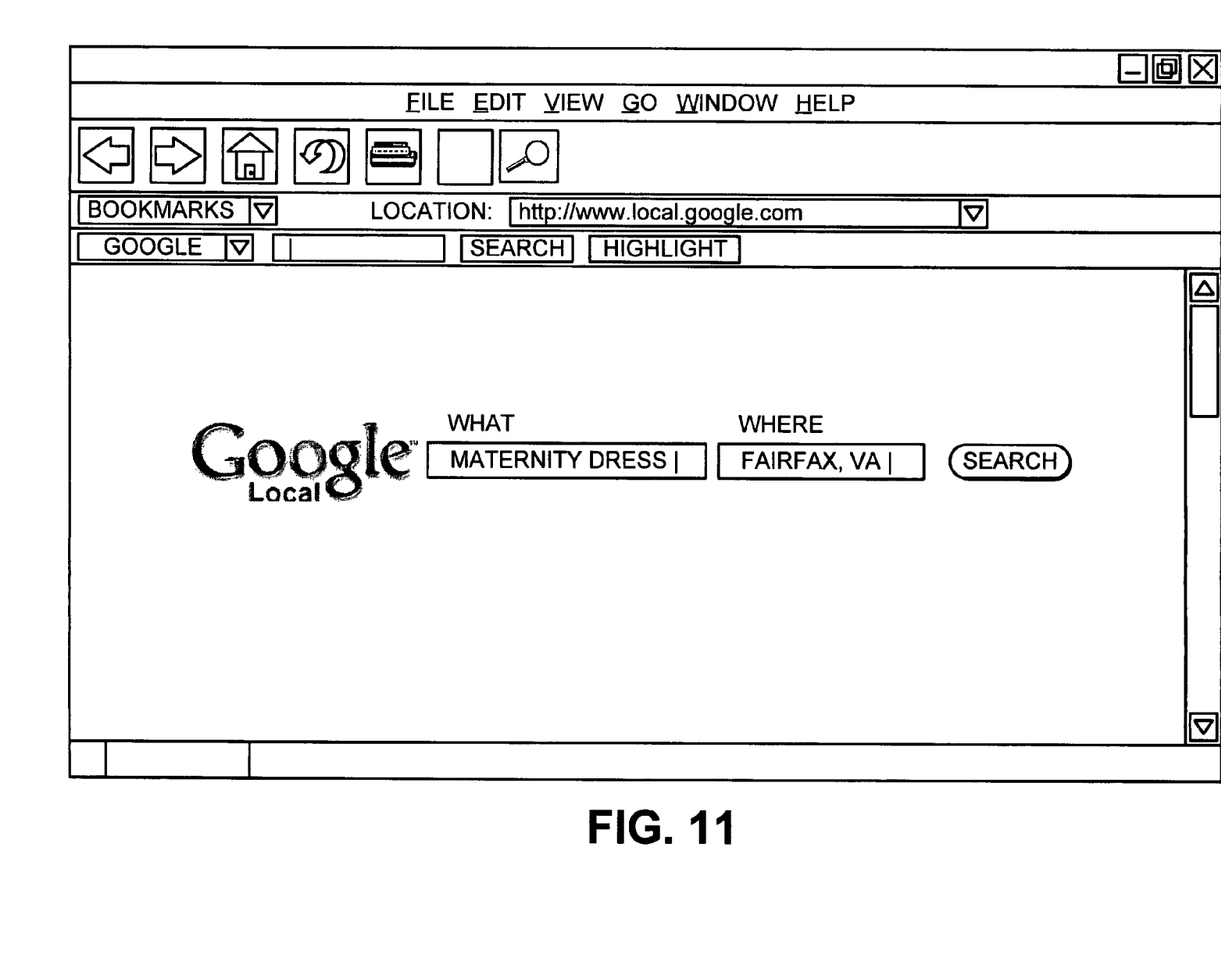
FIGS. 11 and 12 are exemplary diagrams of a local search user interface that may be presented to a user.
Figure 12:
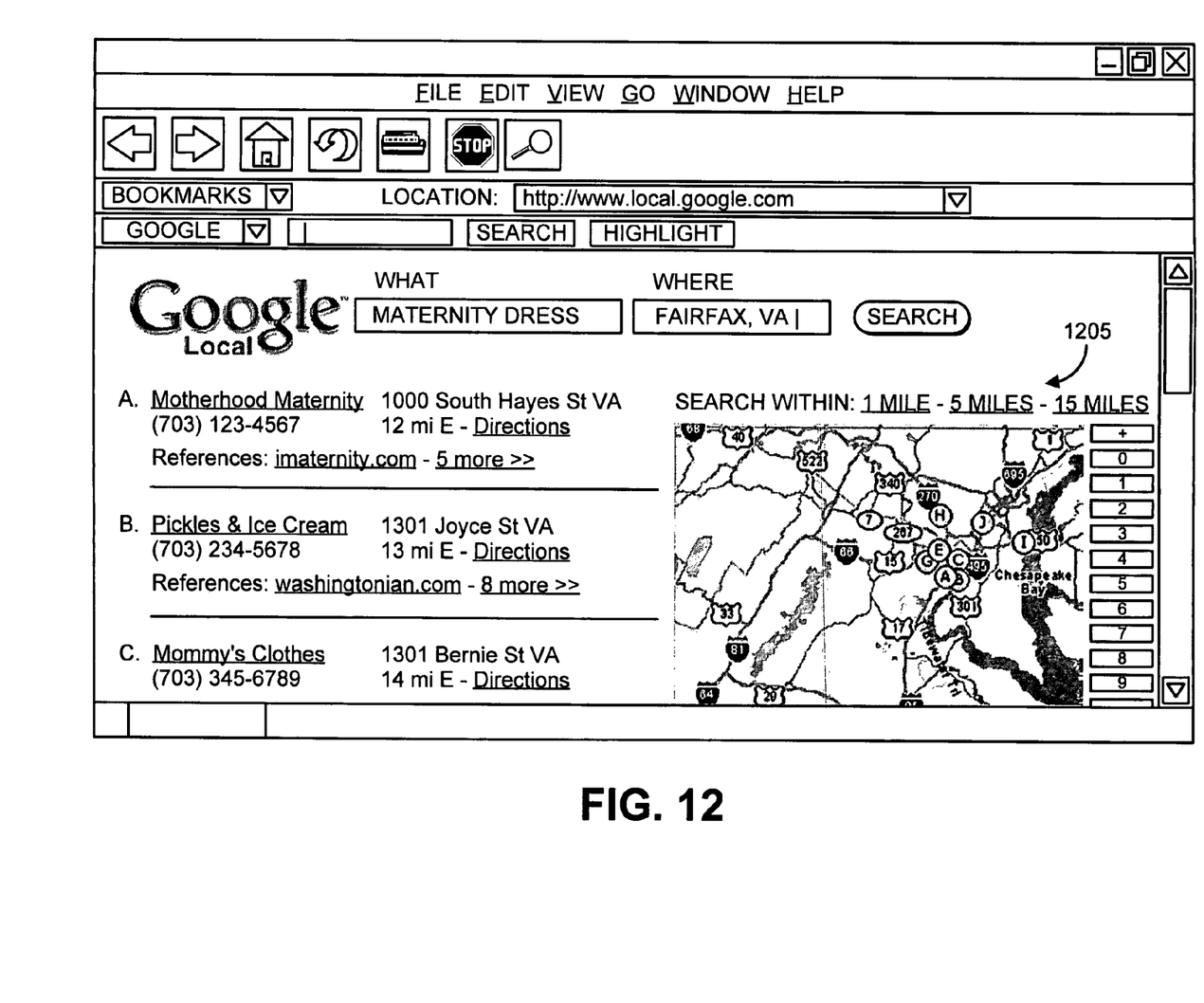

FIGS. 11 and 12 are exemplary diagrams of a local search user interface that may be presented to a user according to an implementation consistent with the principles of the invention. As shown in FIG. 11, a user interface may be presented relating to local searching. The local search user interface may permit a user to search for business listings in a particular location. To assist the user in searching, the user interface may provide a "What" field and a "Where" field. For example, the user may enter the name of a business (e.g., "Pizza Hut") or a type of business (e.g., pizza restaurant) in the "What" field. The user may enter the name of a location (e.g., Albany, N.Y.) in the "Where" field. Assume for this example, that the user entered "maternity dress" in the What field and "Fairfax, Va." in the Where field of the user interface.

In the manner discussed above, a search engine 125 may perform a search based on the search terms "maternity dress" and "Fairfax Va." to identify documents associated with businesses relating to the search terms "maternity dress" in the "Fairfax, Va." location and include the identified documents in a list of search results. The identified documents may be selected from documents that are geographically relevant to a particular geographic region, such as a default region that is 15 miles from an estimated center of the location entered in the "Where" field.

As further shown in FIG. 12, the local search user interface may present the search results to the user. The user may modify the searched region by selecting a different search range from ranges 1205. Selecting a different range may cause another search to be performed using the selected range.

CONCLUSION

A local search engine efficiently indexes documents relevant to a geographical area by indexing, for each document, multiple location identifiers that collectively define an aggregate geographic region. When the index is used to respond to individual search queries, the aggregate geographic region may be efficiently searched by merely adding a location identifier to the search query.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders.

Further, certain portions of the invention have been described as an "engine" that performs one or more functions. An engine may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to potentially allow for one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method, comprising:
   determining, by one or more processors in one or more server devices, one, of a plurality of geographical areas in a grid, associated with a document;
   determining, by one or more processors in one or more server devices, a subset, of the plurality of geographical areas in the grid, each of the subset being at least partially within a circle of a particular radius from the one, of the plurality of geographical areas, associated with the document; and
   indexing, by one or more processors in one or more server devices, the document to include the one, of the plurality of geographical areas, associated with the document and the subset of the plurality of geographical areas.

2. The method of claim 1, where the one, of the plurality of geographical areas, associated with the document and the subset of the plurality of geographical areas are specified by location identifiers.

3. The method of claim 2, where the location identifiers include labels for nodes in a hierarchical triangular mesh.

4. The method of claim 1, where the document is a business listing.

5. The method of claim 1, where the document is a geographically relevant web document.

6. The method of claim 1, where the subset of the plurality of geographical areas are referenced by location identifiers, and the method further comprising:
   determining a plurality of sets of location identifiers, each set of location identifiers being associated with a respective one of the subset of the plurality of the plurality of geographical areas.

7. A computer device comprising:
   means for storing a document index;
   means for dividing a geographical region into a plurality of distinct regions;
   means for determining a geographical location associated with a document;
   means for identifying one of the plurality of distinct regions in which the geographical location is located;
   means for identifying other regions of the plurality of distinct regions surrounding the one, of the plurality of distinct regions, in which the geographical location is located, the other regions being at least partially within a circle of a particular radius from the one of the plurality of distinct regions in which the geographical location is located; and
   means for indexing the document to include, in the document index, a reference to the one of the plurality of distinct regions and the other regions of the plurality of distinct regions.

8. A method, comprising:
   storing, by one or more processors in one or more server devices, a document index;
   determining, by one or more server devices, a geographical location associated with a document;
   dividing, by one or more processors in one or more server devices, a geographical region into a plurality of distinct regions;
   identifying, by one or more processors in one or more server devices, one of the plurality of distinct regions in which the geographical location is located;
   identifying, by one or more processors in one or more server devices, other regions of the plurality of distinct regions that are at least partially within a circle of a particular radius from the one of the plurality of distinct regions in which the geographical location is located;
   associating, by one or more processors in one or more server devices, references to the one of the plurality of distinct regions and the other regions of the plurality of distinct regions with the document; and
   indexing, by one or more processors in one or more server devices, the document with the associated references.

9. The method of claim 8, further comprising:
   determining the associated references to be location identifiers that correspond to nodes in a hierarchical triangular mesh.

10. The method of claim 8, where the plurality of distinct regions are non-overlapping.

11. The method of claim 8, further comprising:

indexing the document by inserting the associated references in an index as if the references were terms in the document.

12. The method of claim 8, where the document is a business listing.

13. The method of claim 8, where the document is a geographically relevant web document.

14. A computer-readable memory device containing programming instructions for execution by a processor, the computer-readable memory device comprising;

programming instructions for dividing a geographical region into a plurality of distinct regions;

programming instructions for identifying a document that is relevant to a geographical location;

programming instructions for identifying one of the plurality of distinct regions in which the geographical location is located;

programming instructions for identifying other regions, of the plurality of distinct regions, surrounding the one of the plurality of distinct regions in which the geographical location is located, the other regions being at least partially within a circle of particular distance from the one of the plurality of distinct regions; and programming instructions for associating references to the one of the plurality of distinct regions and the other regions of the plurality of distinct regions with an index that includes terms from the document.

15. A method comprising:

storing, by one or more processors in one or more server devices, a document index;

determining, by one or more processors in one or more server devices, a geographical location associated with a document;

dividing, by one or more processors in one or more server devices, a geographical region into a plurality of distinct regions;

identifying, by one or more processors in one or more server devices, one of the plurality of distinct regions in which the geographical location is located;

identifying, by one or more processors in one or more server devices, other regions of the plurality, of distinct regions surrounding the one of the plurality of distinct regions in which the geographical location is located, the other regions being at least partially within a circle of a particular distance from the one of the plurality of distinct regions;

indexing, by one or more processors in one or more server devices, the document to include a reference to the one of the plurality of distinct regions and the other regions of the plurality of distinct regions in the document index;

receiving, by one or more processors in one or more server devices, a search query associated with the geographical region;

determining, by one or more processors in one or more server devices, a location identifier associated with the one of the plurality of distinct regions;

determining, by one or more processors in one or more server devices, a plurality of location identifiers associated with the other regions of the plurality of distinct regions; and performing, by one or more processors in one or more server devices, a search for documents relevant to the search query based on a comparison of the search query, the location identifier, and the plurality of location identifiers to the document index.

16. The method of claim 15, further comprising:
transmitting relevant documents, determined by the search, to a user.

17. The method of claim 15, where the location identifier references a node in a hierarchical triangular mesh.

18. The method of claim 15, where receiving the search query includes receiving search terms and geographically descriptive terms entered by a user.

19. The method of claim 15, further comprising:
receiving an indication of a desired search region;
determining a difference between the desired search region and a previously indexed search region;
determining a set of location identifiers based on the difference; and
performing the search based on the search query and the set of location identifiers.

* * * * *